Patented Oct. 26, 1943

2,332,869

UNITED STATES PATENT OFFICE 2,332,869

METHOD OF MANUFACTURING RUBBER-LIKE MATERIALS

Tadao Okita, Imazucho, Nishinomiya, Japan; vested in the Alien Property Custodian No Drawing. Application November 29, 1939, Serial No. 306,684

11 Claims. (Cl. 260—79)

The present application is a continuation in part of my prior copending application Serial No. 94,196, filed August 4, 1936, for "Method of manufacturing oil-proof rubberlike materials."

The present invention relates to a method of manufacturing oil-proof rubber-like materials by the reaction of a dihalogen compound of an olefin such as ethylene or of an ether, a halogen compound of a thio-glycol, or a mixture of the said substances, upon a metallic compound of a thio-diglycol, a metallic compound of glycol, or a mixture of the said substances under ordinary temperature or heating.

The present invention has for its object an easy manufacture of rubber-like materials of great oil-proof property and elasticity and of the least offensive odor.

Research has heretofore been carried out with a view to improving the quality of rubber which, in spite of its extensive utility, is of very limited oil-proof property and also with a view to developing rubber substitutes of great oil-proof property. Such research has resulted in the manufacture of materials which are not only of as great elasticity as rubber but of great oil-proof property, but these materials have the disadvantages of requiring intricate manufacturing methods and of possessing offensive odors, so that the known processes are still unsatisfactory for practical use.

The present invention is the method of manufacturing oil-proof rubber-like materials by the special reaction, under ordinary temperature or heating, of (I) a dihalogen compound of an olefin $C_nH_{2n}X_2$ (e. g. of ethylene), (II) a dihalogen compound of an ether

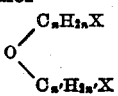

(III) a halogen compound of a polythio-diglycol

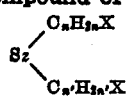

(IV) a halogen compound of a monothio-diglycol

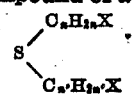

or a mixture of the said substances upon (V) a metallic compound of a polythio-diglycol

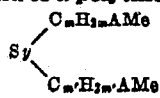

(VI) a metallic compound of a monothio-diglycol

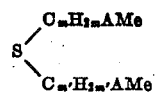

(VII) a metallic compound of a glycol

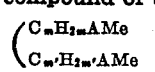

or a mixture of the said substances. In the above chemical expressions, A is an oxygen group element such as O, S, Se, Te; X is a halogen group element such as Cl, F, I, Br; Me is a metal of the group Na, K, Mg, Ag, Zn, Ca; $m, n, m', n', y, z$ are positive integers; $m, m'$ being between 1 and 2; $n, n'$ being between 1 and 4; $y, z$ being between 2 and 4.

To take a few examples, (1) The mixture by respective chemical equivalents of (V) di-sulphide of sodium ethylate

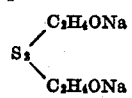

(which is a kind of metallic compound of a polythio-diglycol) and (I) ethylene chloride $C_2H_4Cl_2$ is put in reaction by heating at 70° C.–150° C. for about two hours. The ethereal reaction thereby caused separates sodium chloride, leaving a rubber-like material.

(2) The mixture by respective chemical equivalents of (V) a magnesium compound of tetra-thio-di-thio-glycol

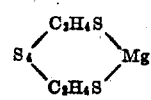

(which is a kind of metallic compound of a thio-diglycol) and (II) a bromine compound of methyl-ethyl ether

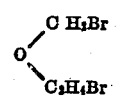

is put in reaction by heating at 70° C.–150° C. The ethereal reaction thereby caused separates magnesium bromide, leaving a rubber-like material.

(3) The mixture by chemical equivalents of (VII) potassium glycolate

(which is a kind of metallic compound of glycol), and (III) trisulphide of ethyl iodide and propyl iodide

is put in reaction by heating at 70° C.–150° C. The ethereal reaction thereby caused separates potassium iodide, leaving rubber-like materials.

In any case, however, if (I), (II) or (IV) i. e. a dihalogen compound of an olefin or of an ether or a halogen compound of a monothio-diglycol whose chemical expression is

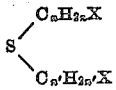

acts upon (VI) a metallic compound of a monothio-diglycol whose chemical expression is

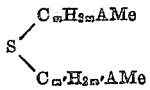

or if (VII) a metallic compound of a glycol acts upon (IV) a halogen compound of a monothio-diglycol; or if (I) or (II) i. e. a dihalogen compound of an olefin or a dihalogen compound of an ether acts upon (VII) a metallic compound of a glycol, not rubber-like materials but a powder is engendered.

It will be clear, therefore, that in reacting (I), (II), (III), (IV) or mixtures thereof with (V), (VI), (VII) or mixtures thereof one should select these compounds or mixtures thereof so as to avoid the above described inoperative combinations (I)+(VI), (II)+(VI), (IV)+(VI), (I)+(VII), (II)+(VII), (IV)+(VII), and so as to give substantially only the following combinations: (I)+(V), (II)+(V), (III)+(V), (IV)+(V), (III)+(VI), (III)+(VII).

Although tests have been conducted on a very large number of reactions typically representative of the various classes of reaction above defined, and although such tests have indicated that nearly all the reactions above defined are effective to produce new and useful compositions most of which have properties resembling those of more or less vulcanized rubber, nevertheless, I believe that the most widely useful new compositions of my invention are those obtained by choosing $m$, $m'$, $n$, $n'$, $y$, $z$, A, Me as follows: $m$, $m'$ are between 1 and 2 (being preferably 2); $n$ is between 2 and 4; $n'$ is between 2 and 4; $y$ is between 2 and 4; $z$ is between 2 and 4; A=oxygen or sulphur; Me=sodium, potassium or magnesium. (Whenever an integer is defined as being between two limiting numbers, the range of values of such integer is to be taken to include both limiting numbers.)

In particular I prefer as the very best modes of practising my invention the nine reactions resulting from the combining of (I) + (V) where A=oxygen, X=chlorine, $m=2$, $m'=2$, $n=2$, 3 or 4, and $y=2$, 3 or 4. These nine embodiments may all be defined as the reactions of a dihalogenated olefin $C_nH_{2n}Cl_2$ (where $n=2$, 3 or 4) with a polysulphide of sodium ethylate

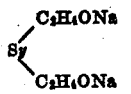

(where $y=2$, 3 or 4). The reactions may be effected at ordinary temperatures or at moderately elevated temperatures up to about 150° C.

These nine reactions may be schematically represented as follows:

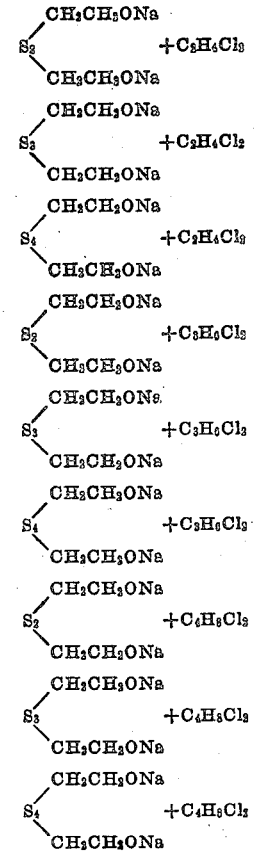

The materials produced by the present invention have the advantages of great oil-proof property and elasticity, the least offensive odor and an easy method of manufacture.

Although I have shown and described certain embodiments of my invention for the purpose of illustration, it will be understood generally that adaptations, alterations and modifications thereof occurring to one skilled in the art may be made without departing from the scope of my invention as defined in the appended claims.

What is claimed is:

1. The method of manufacturing an oil-proof rubber-like material, which comprises mixing ethylene chloride which has the formula $C_2H_4Cl_2$ with the tetrasulphide of sodium ethylate which has the formula

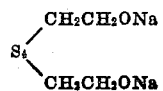

and maintaining the mixture at a temperature between about 70° C. and 150° C. until sodium chloride and a rubber-like material are formed.

2. The method of manufacturing an oil-proof rubber-like material, which comprises mixing propylene chloride which has the formula $C_3H_6Cl_2$ with the trisulphide of sodium ethylate which has the formula

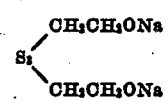

and maintaining the mixture at a temperature between about 70° C. and 150° C. until sodium chloride and a rubber-like material are formed.

3. The method of manufacturing an oil-proof rubber-like material, which comprises mixing butylene chloride which has the formula $C_4H_8Cl_2$ with the disulphide of sodium ethylate which has the formula

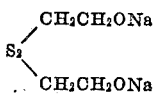

and maintaining the mixture at a temperature between about 70° C. and 150° C. until sodium chloride and a rubber-like material are formed.

4. The method of manufacturing oil-proof rubber-like material by mixing a metallic compound of polythio-glycol which has the formula

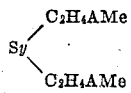

where $y$ is an integer between 2 and 4, Me is a metal of the group consisting of Na, K, Mg, Zn, Ag, Ca, and A is an element of the group consisting of oxygen and sulphur, with a dihalogenated olefin having the formula $C_2H_4X_2$, where X is a halogen, and maintaining said mixture at a reactive temperature.

5. The method of manufacturing oil-proof rubber-like material by mixing a metallic compound of polythio-glycol which has the formula

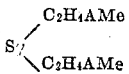

where $y$ is an integer between 2 and 4, Me is a metal of the group consisting of Na, K, Mg, Zn, Ag, Ca, and A is an element of the group consisting of oxygen and sulphur, with a dihalogenated olefin having the formula $C_3H_6X_2$, where X is a halogen, and maintaining said mixture at a reactive temperature.

6. The method of manufacturing oil-proof rubber-like material by mixing a metallic compound of polythio-glycol which has the formula

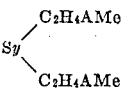

where $y$ is an integer between 2 and 4, Me is a metal of the group consisting of Na, K, Mg, Zn, Ag, Ca, and A is an element of the group consisting of oxygen and sulphur, with a dihalogenated olefin having the formula $C_4H_8X_2$, where X is a halogen, and maintaining said mixture at a reactive temperature.

7. The method of manufacturing oil-proof rubber-like material by mixing a metallic compound of polythio-glycol which has the formula

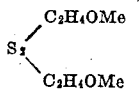

where Me is a metal of the group consisting of Na, K, Mg, Zn, Ag, Ca, with a dihalogenated olefin having the formula $C_nH_{2n}X_2$, where $n$ is an integer between 2 and 4 and X is a halogen, and maintaining said mixture at a reactive temperature.

8. The method of manufacturing oil-proof rubber-like material by mixing a metallic compound of polythio-glycol which has the formula

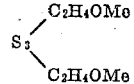

where Me is a metal of the group consisting of Na, K, Mg, Zn, Ag, Ca, with a dihalogenated olefin having the formula $C_nH_{2n}X_2$, where $n$ is an integer between 2 and 4 and X is a halogen, and maintaining said mixture at a reactive temperature.

9. The method of manufacturing oil-proof rubber-like material by mixing a metallic compound of polythio-glycol which has the formula

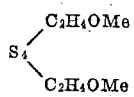

where Me is a metal of the group consisting of Na, K, Mg, Zn, Ag, Ca, with a dihalogenated olefin having the formula $C_nH_{2n}X_2$, where $n$ is an integer between 2 and 4 and X is a halogen, and maintaining said mixture at a reactive temperature.

10. The method of manufacturing oil-proof rubber-like material by mixing a metallic compound of polythio-glycol which has the formula

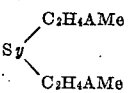

where $y$ is an integer between 2 and 4, Me is a metal of the group consisting of Na, K, Mg, Zn, Ag, Ca, and A is an element of the group consisting of oxygen and sulphur, with a dihalogenated olefin having the formula $C_nH_{2n}X_2$, where $n$ is an integer between 2 and 4 and X is a halogen, and maintaining said mixture at a reactive temperature.

11. The method of manufacturing oil-proof rubber-like material by mixing a metallic compound of polythio-glycol which has the formula

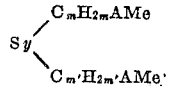

where $m$ and $m'$ are integers between 1 and 2, $y$ is an integer between 2 and 4, Me is a metal of the group consisting of Na, K, Mg, Zn, Ag, Ca, and A is an element of the group consisting of oxygen and sulphur, with a dihalogenated olefin having the formula $C_nH_{2n}X_2$, where $n$ is an integer between 1 and 4 and X is a halogen, and maintaining said mixture at a reactive temperature.

T. OKITA.